United States Patent [19]

Holecek

[11] 3,983,584

[45] Oct. 5, 1976

[54] VEHICLE INVALID LIFT DEVICE

[76] Inventor: Otto C. Holecek, 9255 Clancey Ave., Downey, Calif. 90240

[22] Filed: June 17, 1975

[21] Appl. No.: 587,555

Related U.S. Application Data

[63] Continuation-in-part of Ser. No. 520,373, Nov. 4, 1974, abandoned.

[52] U.S. Cl. ........................................ 5/81 R; 5/92; 214/75 H

[51] Int. Cl.$^{2}$ ........................................ B60P 1/02

[58] Field of Search .............................. 5/81, 84–89; 214/75 H, 450

[56] References Cited

UNITED STATES PATENTS

| | | | |
|---|---|---|---|
| 1,588,573 | 6/1926 | Edmiston | 5/89 X |
| 2,793,768 | 5/1957 | Schaedler | 5/89 X |
| 3,656,637 | 4/1972 | Lynn | 214/75 H |
| 3,804,263 | 4/1974 | Castonquay | 214/75 H |

*Primary Examiner*—Casmir A. Nunberg
*Attorney, Agent, or Firm*—John T. Matlago

[57] ABSTRACT

An invalid lift for use with vehicles is adapted to be mounted on a hinged vehicle door. By such a mounting, the horizontal translational motion required to transfer the invalid into and out of a seat of the vehicle is provided by the swinging of the vehicle door on its hinges.

13 Claims, 16 Drawing Figures

FIG. 8
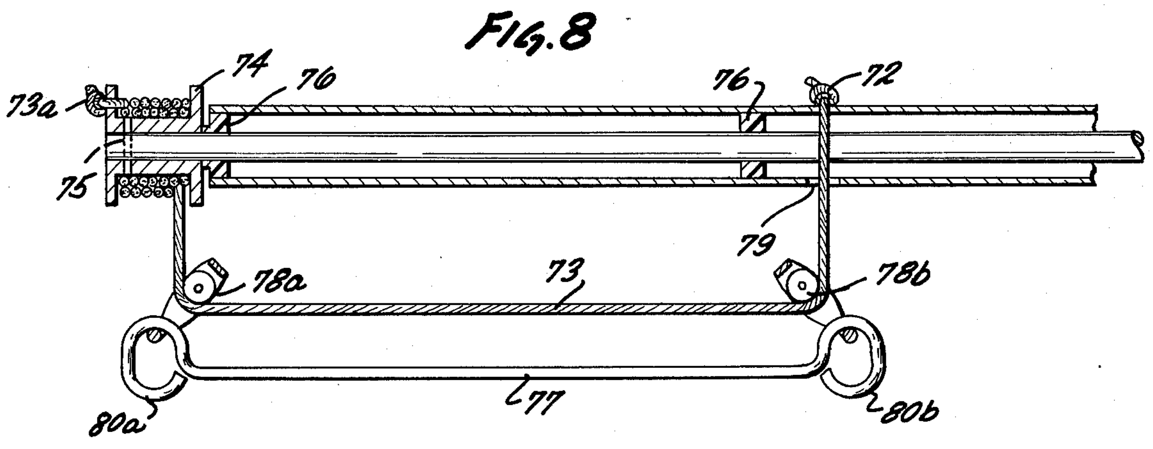
FIG. 9
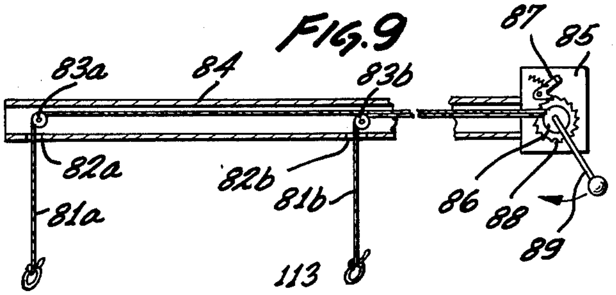
FIG. 10
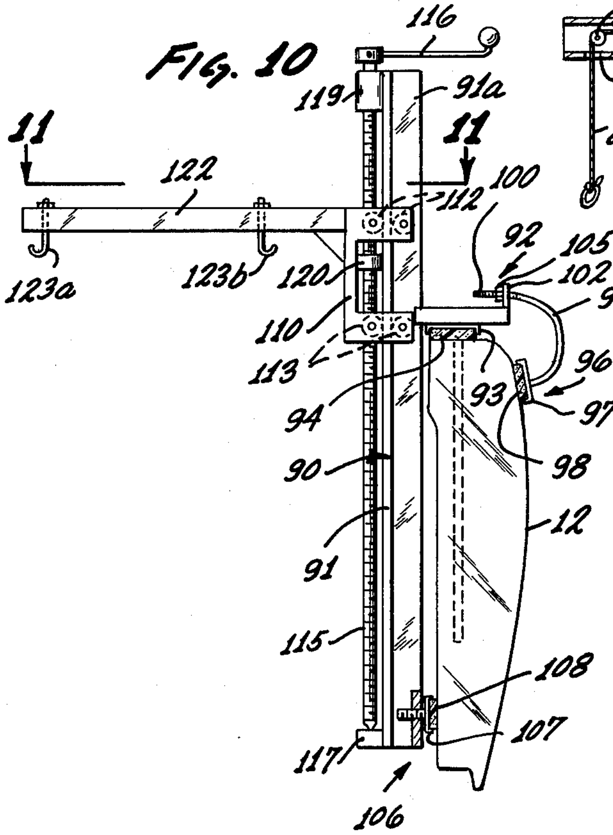
FIG. 12
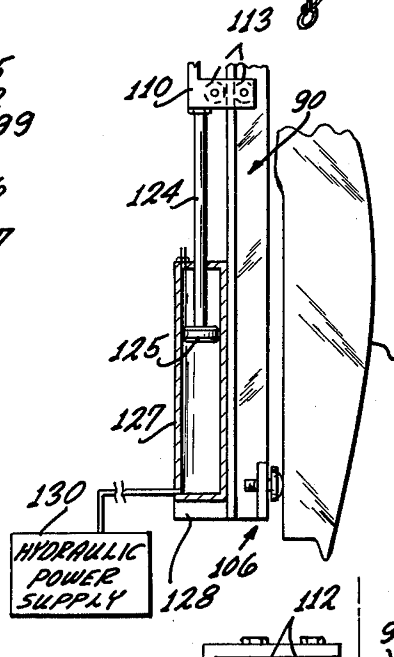
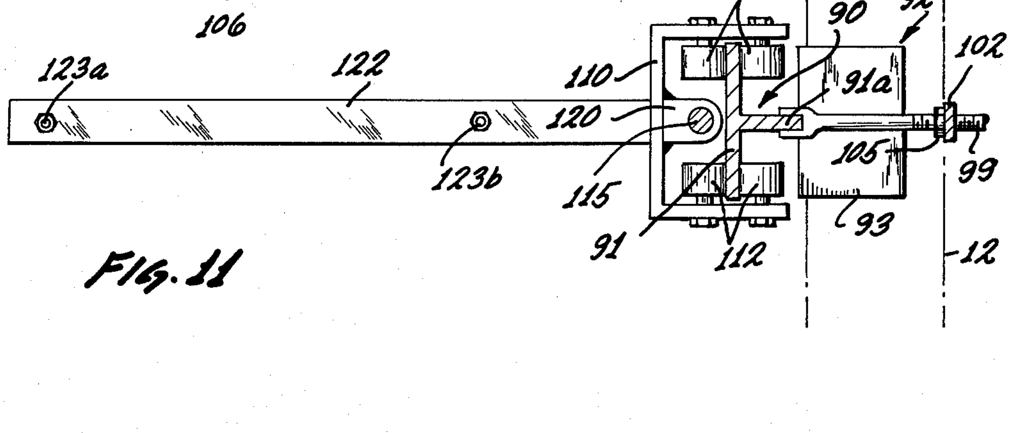
FIG. 11

FIG. 13
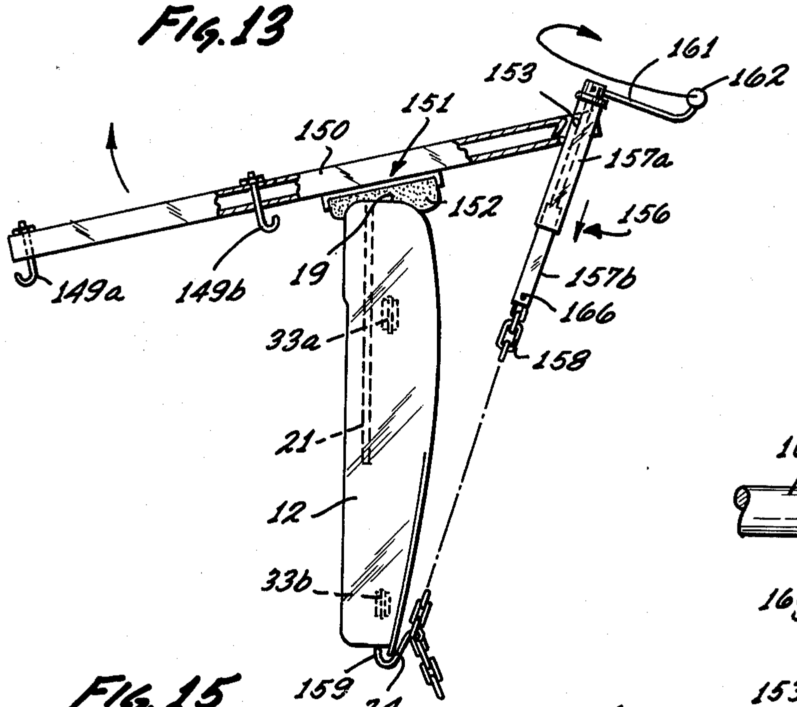
FIG. 16
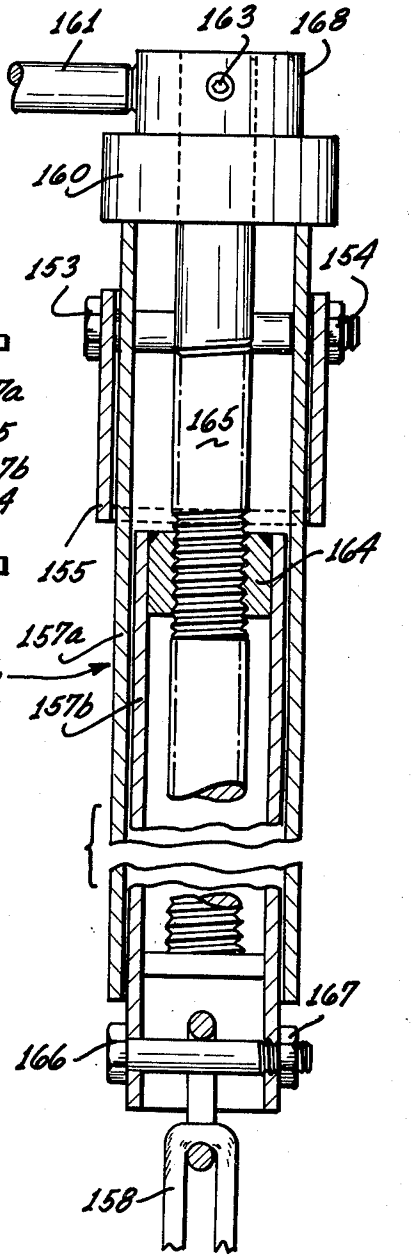
FIG. 15
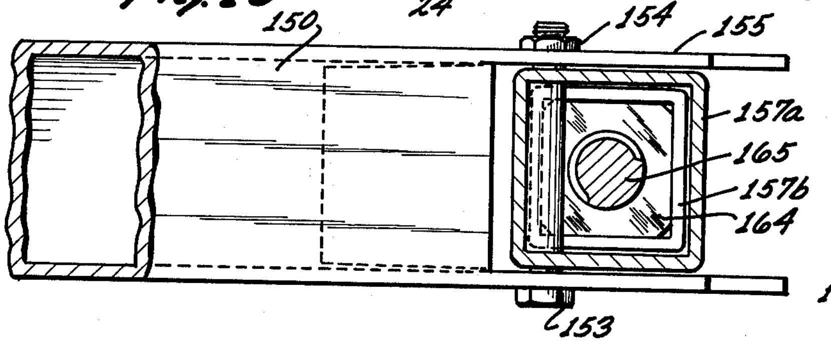
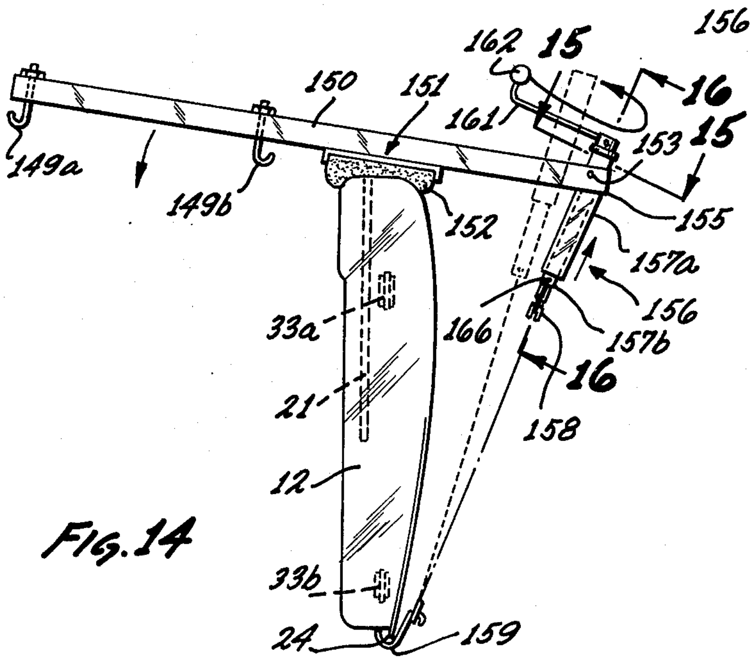
FIG. 14

VEHICLE INVALID LIFT DEVICE

This application is a continuation-in-part of copending application, Ser. No. 520.373, filed Nov. 4, 1974.

This invention relates to an invalid lift device adapted to be mounted on a vehicle for transferring a wheelchair invalid into and out of a seat of the vehicle.

Heretofore, invalid lift devices for use with vehicles have consisted of apparatus that is mounted to some part of the body of the vehicle such as the roof, the base frame, the firewall or the doorway frame thereof. In general, such mounting of invalid lift devices has required either a permanent or cumbersome installation of the apparatus on the body of the vehicle or a mechanical conversion of some part of the vehicle to adapt to the mounting of the apparatus. Furthermore, such prior devices have incorporated horizontal transfer means as well as lifting and lowering means as necessary integral capabilities of the devices.

Accordingly, one of the objects of the present invention is to provide a invalid lift device for use with vehicles which does not require the permanent installation of the device or the modification of any portion of the vehicle such as the drilling of holes on the body proper thereof for the mounting of the invalid lift device thereon.

Another object of the present invention is to provide a novel, simplified, lift device for invalids which can be readily mounted on a door of a vehicle and thus takes advantage of the normal swing motion capability of the vehicle door on its hinges to provide the horizontal translational motion required to transfer the invalid into and out of the interior of the vehicle.

Still another object of the invention is to provide an invalid lift device which is lightweight and readily carried, and which can be easily and quickly operably mounted for use on the lower ledge of the open window frame of the door of any vehicle and can just as easily and quickly be removed when not in use.

With these and other objects in view, the invention consists in the construction, arrangement and combination of the various parts of the device whereby the objects contemplated are attained, as hereinafter setforth, pointed out in the appended claims and illustrated in the accompanying drawings:

In the drawings:

FIG. 8 is an alternate arrangement for taking up the cable;

FIG. 9 is an alternate embodiment of the lift mechanism;

FIG. 10 is a further embodiment of the invalid lift device adapted for being mounted on an automobile door;

FIG. 11 is a view taken along line 11—11 of FIG. 10; and

FIG. 12 is a hydraulic actuated version of the embodiment of FIG. 10;

FIG. 13 is another embodiment of the invalid lift device mounted for use on an automobile door and shown with the inner end portion of its beam in its lowered position;

FIG. 14 is a view of the invalid lift device of FIG. 13 shown with the inner end portion of its beam in its raised position;

FIG. 15 is a sectional view of the linkage assembly as taken along line 15—15 of FIG. 14; and FIG. 16 is a sectional view of the linkage assembly as taken along line 16—16 of FIG. 14.

Figure 1:
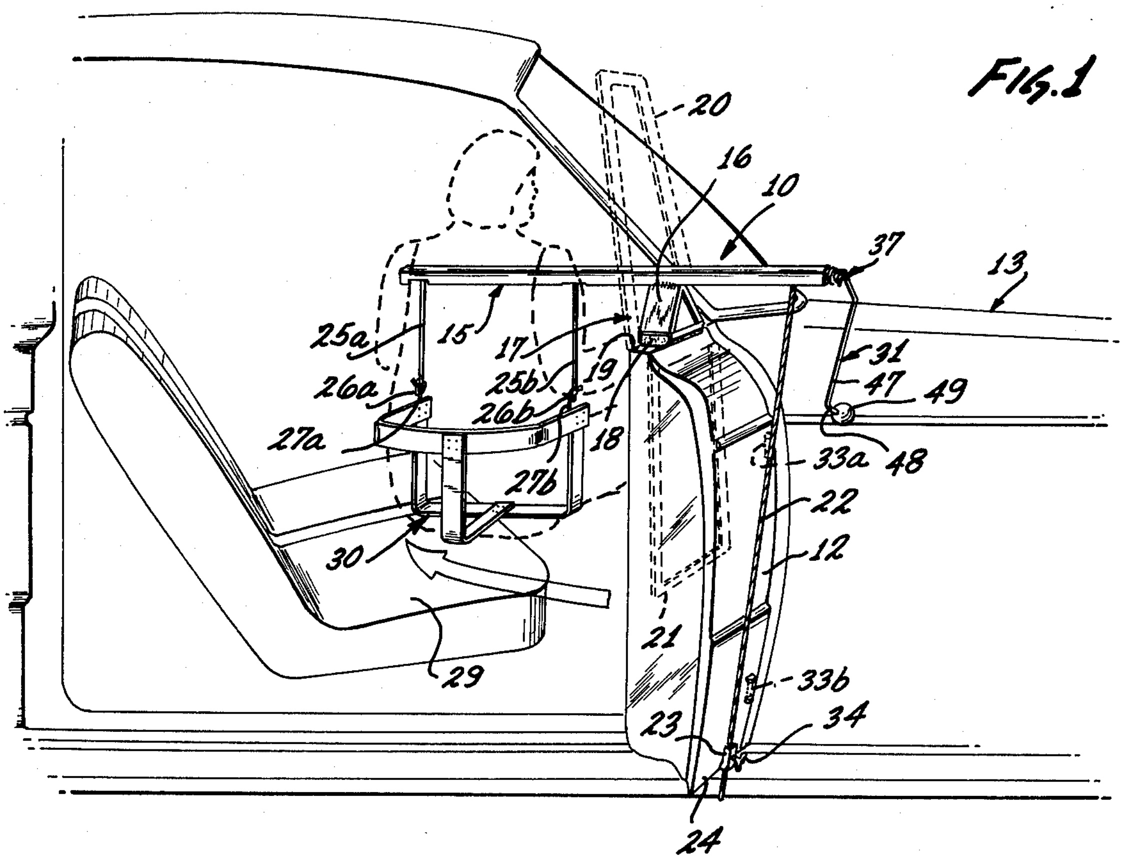
FIG. 1 is a perspective view showing the invalid lift device of the present invention mounted for use on the door of an automobile.
Figure 2:
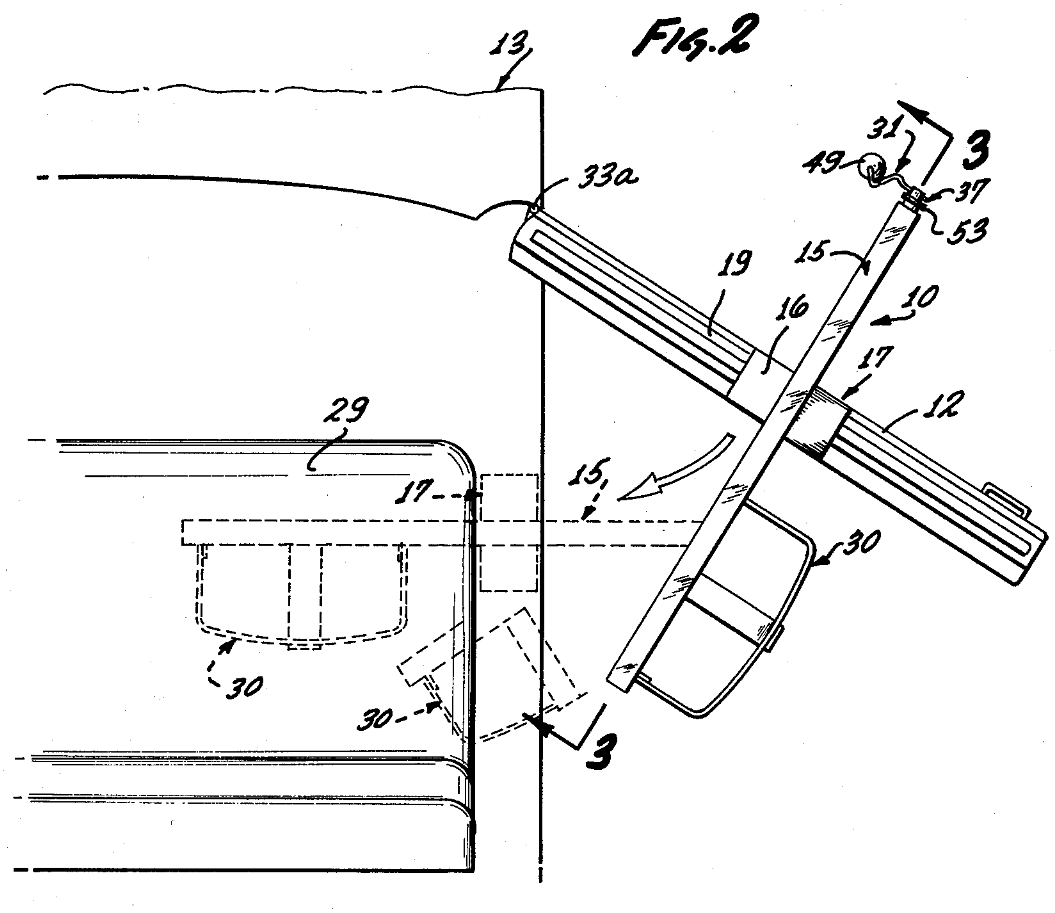
FIG. 2 is a plan view of the invalid lift device of FIG. 1 illustrating the support seat being horizontally transferred into the interior of the automobile.

Referring to the drawings, FIG. 1 illustrates the invalid lift device 10 of the present invention mounted on a front door 12 of an automobile 13. The invalid lift device comprises a longitudinal arm or beam 15 having a support 17 therefor intermediate the ends thereof. The support 17 which is preferably a triangular structure is provided with a cushion 18 on the bottom thereof. With the door 12 swung on its upper and lower hinges **33*a* and 33*b* to an open position and the window 21 of the door 12 rolled down, the beam 15 is positioned crosswise of the window opening 20 with the support 17 resting on its cushion 18 on the bottom window ledge 19. As shown in FIG. 2, the beam 15 is positioned so as to be approximately midway of the length of the bottom ledge 19.**

Figures 3, 4, 5, 6, 7:
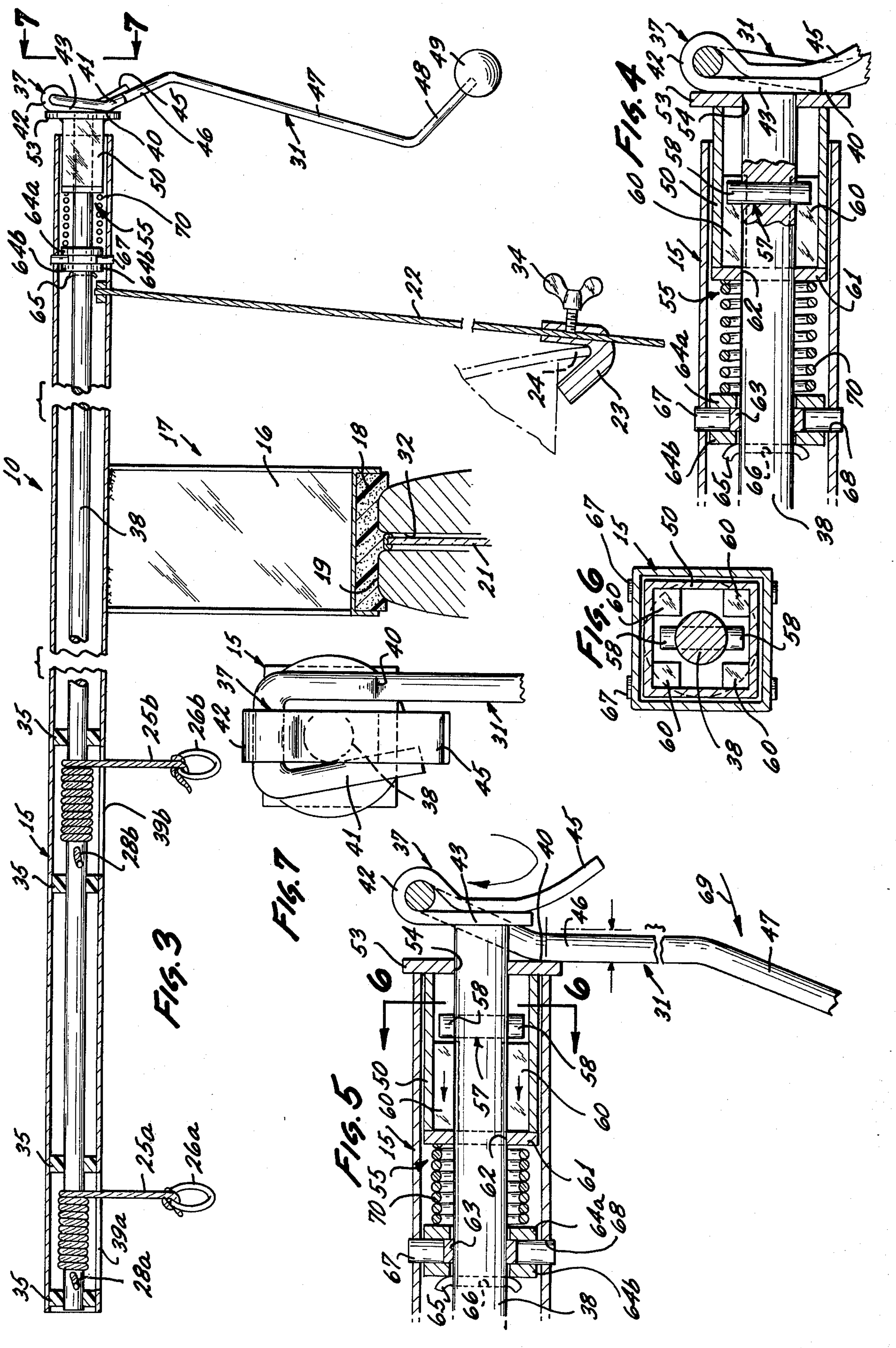
FIG. 3 is a longitudinal sectional view of the beam as taken along line 3—3 in FIG. 2.
FIG. 4 is an enlarged sectional view of the end portion of the shaft in its normally locked position within the beam.
FIG. 5 is an enlarged sectional view of the end portion of the shaft with the handle moved inwardly to disengage and thereby enable the shaft to be rotated within the beam.
FIG. 6 is a cross sectional view as taken along line 6—6 in FIG. 5.
FIG. 7 is an end view as taken along line 7—7 in FIG. 3

As shown in FIGS. 1 and 3, a wire rope 22 has its upper end attached near the outer end of the beam 15 and its lower end attached to a hook 23 by which it is held to the bottom edge 24 of the door 12. The positioning of the hook 23 along the length of the wire rope 22 can be adjusted to fit various size doors by a thumbscrew 34. Thus, the effective length of the wire rope 22 is selected so that when the beam 15 is horizontally disposed, the wire rope 22 is held taut. A pair of spaced wire lift cables **25*a* and 25*b* are wound about a shaft 38 (FIG. 3) rotatably mounted within the beam 15. The ends of the lift cables 25*a* and 25*b* extending down from the inner end portion of the beam 15 are provided with metal loops 26*a* and 26*b*. A canvass invalid support seat or carrier 30 being worn by an incapacitated person is attached by quick connections 27*a* and 27*b* to the metal loops 26*a* and 26*b* on the ends of cables 25*a* and 25*b*.**

A handle 31 on the outer end of the beam 15 is attached to the end of the shaft 38. As will be subsequently described, the shaft 38 is normally held within the beam 15 in a rotational locked position and is released by moving the end knob 49 on the handle 31 inwardly toward the beam. The rotating of the handle 31 in one direction then provides for raising the support seat 30 and the rotating of the handle 31 in the opposite direction provides for lowering the support seat 30. In this way the support seat 30 with the incapacitated person thereon can be placed at a desired elevation. Releasing of the knob 49 provides for the shaft 38 being again held in its locked position within beam 15.

It should now be clear that the beam 15 is disposed with its support 17 resting on the lower ledge 19 of the open window 20 on the door 12 such that the load of the incapacitated person or invalid on the inner end portion of the beam is counteracted by the tensioned wire rope 22 connecting the outer end portion of the beam 15 to the lower edge 24 of the door 12. The wire rope 22 thus provides for transferring the cantilevered load of the incapacitated person to the upper and lower hinges 33*a* and 33*b* of the door, and ultimately to the vehicle structural frame. It should be further understood that in order to horizontally swing the support seat 30 carrying the incapacitated person either way through the open doorway of the automobile 13, so as to either position the person above the seat 29 of the automobile or outside the open doorway so that he can be seated in a wheelchair (not shown), the door 21 need be merely swung about on its upper and lower hinges 33*a* and 33*b* by the attendant. It should be appreciated that in the use of the invalid lift 10 recognition is made of the fact that the load bearing capabilities of the door 12 structure including the upper and lower hinges 33*a* and 33*b* of the door 12 are of such magnitude that they can safely provide for supporting the invalid load for purposes of transfer.

The details of the invalid lift device 10 will next be described. As shown in FIGS. 1, 3 and 6, beam 15 is preferably formed of tubing having a square cross-section. Rotatably mounted on a plurality of spaced nylon bearings 35 disposed within the beam 15 is the shaft 30. The beam 15 has a pair of spaced slots 39*a* and 39*b* on the lower inner end portion thereof. The lift cables 25*a* and 25*b* are wound about the shaft 38 with their upper ends 28*a* and 28*b* attached to the shaft 38 and with their lower ends extending down through the respective slots 39*a* and 39*b*. The spaced nylon bearings 35 are press fitted within the beam 15 so that pairs thereof are located on either side of the slots 39*a* and 39*b*. The pairs of bearings 35 thus form compartments to confine the windings of the respective cables 25*a* and 25*b*.

The legs 16 of the preferably triangular support 17 for the beam 15 are formed of channel members which extend downwardly and outwardly from the bottom of the beam 15. The base 24 of the support structure which is likewise formed of a channel member has secured on the bottom thereof the resilient cushion 18 formed of a soft spongy material, for example, Such an arrangement enables the lift device 10 to be stably and adaptably mounted on the uneven surface of the ledge 19 of the window opening 20 on the door 12. The unevenness is caused in part by the gap 32 provided in the wall of the door for receiving the turned down window 21. The cushion 18 is made sufficiently wide so as to be wider than the wall of the lower ledge 19. It should be particularly noted that by providing a cushion 18 of a resilient material, the support 17 is adapted to rest in a stable manner on a wide variety of different cross sectional shapes and sizes of lower window ledges 19. The further forming of the cushion 18 of rubber material serves under load conditions to frictionally grip the ledge 19 to prevent the support 17 from slipping sidewise relative to the ledge 19. It should be understood that cushion 18 can also be in the form of a sand-bag.

As shown in FIGS. 3, 4, 5 and 7, attached to the end of the shaft 38 of the outer end of the beam 15 is the handle or crank 31 which provides for rotating the shaft 38 to raise or lower the support seat 30 by spooling the lift cables 25*a* and 25*b*. The shaft 38 is provided with an end cross member 37 which is formed with a flat inner portion 43, a side loop portion 42 and an outwardly curved outer portion 45. The face of the flat inner portion 43 of the end cross member 37 is preferably welded to the end of the shaft 38 such that the loop portion 42 is displaced to the side of the axis of shaft 38. The inner end portion of the handle 31 is bent in a U-shape and fitted into the looped portion 42 of the end cross member 40. An outward bend 40 is then formed at a point on the handle 31 leading to a short straight portion 46 thereof. The bend 40 is located on the opposite side of the axis of shaft 38 from the loop portion 42. The lower end of the straight portion 46 of the handle 31 is then bent inwardly to form a long straight portion 47 and then bent outwardly again to form a short straight terminating portion 48. A knob 49 is provided on the lower end of the handle 31. As shown in FIG. 7, the terminating end 41 of the upper U-shaped portion of handle 31 is bent inwardly to engage the outwardly curved portion 45 of member 40. The curved portion 45 of end cross member 37 thus acts as a stop for the outward movement of handle 31.

As shown in FIGS. 3, 4, 5 and 6, fitted within the outer end beam 15 and on the end portion of the shaft 38 is a shaft rotation lock assembly 55 comprised of a sleeve 50 having a square cross section, a compression spring 70, and a tubular spacer 63 having a washer 64*a* and 64*b* on either side thereof. At the inner end of sleeve 50 is a washer 61 with a concentric circular opening 62 through which the shaft 38 extends. The outer end of sleeve 50 has a circular cap 53 with a concentric circular opening 54 through which the end of shaft 38 extends for attachment to the face of the flat portion 43 of the end cross member 40. The diameter of cap 53 is large such that it extends beyond the sides of the square beam 15. A diametrically transverse pin 57 is provided on the portion of the shaft 38 within the sleeve 50. The ends of pin 57 extending outward from either side of the shaft 38 form stops 58.

Mounted on each of the four corners of the interior of the sleeve 50 are short rods 60 having square cross sections. Located inwardly on the shaft 38 spaced away from the bottom end of the sleeve 50 is the tubular spacer 63 with washers 64*a* and 64*b* on either side thereof. The spring 70 surrounding the shaft 38 has one end bearing on the washer 64*a* and the other end bearing on the washer 61 next to sleeve 50. A retainer in the form of a cross pin 65 extends through an opening 66 on the shaft 38 and bears against the washer 64*b* and holds the shaft lock assembly 55 in position on the end of shaft 38. A pair of pins 67 passing through holes 68 in the beam 15 on either side of the shaft 38 and between the spaced washers 64*a* and 64*b* hold the shaft lock assembly 55 and shaft 38 relative to the beam 15. The spring 70 surrounding the shaft 38 serves to hold the sleeve 50 on shaft 38 at a spaced relation relative to the washer 64*b* such that the stops 58 formed by the opposite ends of pin 57 are engaged in the spaces between the corner rods 60 on the inner bottom of the sleeve 50. (FIGS. 4 and 6).

It should now be clear that the shaft lock assembly 55 on shaft 38 normally operates to prevent the shaft 38 from being rotated by the handle 31 or by the weight of the invalid on the support seat 30 when the handle 31 is released by the attendant. When it is desired to rotate the shaft 38 for the purpose of either raising or lowering the support seat 30, the attendant moves the handle 31 inwardly by use of the knob 49, as indicated by the arrow 69 in FIG. 5. This causes the bend 40 on the upper portion of the handle 31 to bear against the outer face of cap 53 such as to force the sleeve 50 to be moveod inwardly relative to the shaft 38 by compressing the spring 70 against the washer 64a. The inward movement of sleeve 50 moves the short rods 60 inwardly relative to the pin 57 on shaft 38 so as to free the stop 58 permitting the shaft 38 to be rotated in either direction.

It should now be clear that the cooperation of the corner rods 60 within the sleeve 50 with the stops 58 on the shaft 38 function as a self locking safety feature. Thus, in the event that the attendant should ever accidently release the knob 49 on the end of handle 31, the sleeve 50 will be pushed forward by spring 70 to assume the position as shown in FIGS. 4 and 6 in which its corner rods 60 engage the stops 58 causing the shaft 38 to be locked so that it can not rotate within the beam 15. Thus the shaft locking assembly 55 will not allow an incapacitated person in the support seat 30 to drop.

FIG. 8 is an alternate arrangement, with parts shown in section, for winding the lift cable on the shaft 38. In this case a single length of cable 73 is provided which is wound up on a single drum 74 attached by a pin 75 to the end of the shaft 38 which rotates in nylon bearings 76 within beam 15. A metal cross bar 77 is provided with pulleys 78*a* and 78*b* connected on the respective looped ends 80*a* and 80*b* thereof. The free end 73*a* of the cable 73 is secured to the drum 74 and extends down from the drum 74 about the pulley 78*a* and across to the pulley 78*b* and then about and up through holes 79 in the bottom and top of the beam 15 for attachment at 72 to the top thereof. The crank arrangement on the end of the shaft 38 and beam 15 for the embodiment in FIG. 8 may be the same as that shown in FIG. 3. It should be noted that the cross bar 77 is needed in this arrangement of the lift cable 73 to hold the sides of the canvass support seat 30 in a spaced relation. The looped ends 80*a* and 80*b* receive the quick connectors 27*a* and 27*b* of support seat 30, as shown in FIG. 1.

FIG. 9 is a further alternate arrangement whereby a pair of lift cables 81*a* and 81*b* are provided. However, instead of these lift cables being individually wound about the rotatable shaft 38, as in FIG. 3, they are directed by respective pulleys 83*a* and 83*b* supported within the hollow beam 84 toward a housing 85 on the end of the beam 84 which encloses a winch assembly including a cylindrical drum 86 on which the cables 83*a* and 83*b* are wound. A pawl 87 cooperating with a ratchet wheel 88 on the end of the drum 85 provides for the winch assembly to be self locking so that when the hand crank 89 is released it will not allow an invalid on a support seat 30 coupled to the ends of the lift cables 81*a* and 81*b* to drop. It is clear that the drum 86 can also be rotated by an electric gear motor powered by the vehicle battery or other source of electrical power.

FIGS. 10 and 11 show a further alternate embodiment of the support arrangement for the invalid lift device on the automobile door 12. In this arrangement a T shaped vertical strut 90 having a guide member 91 with a stiffening leg 91*a* is positioned on the inside of the door 12. A horizontal support 92 attached to strut 90 intermediate the ends thereof rests on the window ledge 19 of the door 12 by means of a saddle formed of a channel member 93 provided with a bottom cushion 94. An upper standoff side stop 96 formed of a channel member 97 with a cushion 98 contacts the upper outer side of the door 12 and is provided with a curved arm 99. The threaded end 100 of arm 99 extends through an opening in an ear 102 on the support 92 and is adjustably held by a nut 105 such that the side stop 96 can be made to fit any of the variety of contoured door frames. Also provided is a lower standoff side stop 106 bearing on the lower inner side of the door 12 formed of a channel member 107 with a cushion 105. The side stop 106 is adjustably held by a bolt 109 on the lower end of the vertical strut 90. A carriage 110 having a pair of upper rollers 112 and lower rollers 113 on either side thereof rides along the surfaces of the guide member 91 of vertical strut 90. The carriage 110 is caused to be moved by a lead screw 115 whose bottom end is rotatably held on a thrust bearing foot 117 on the lower end of the strut 90 and whose upper end is held on a bearing 119 on the upper end of the strut. A nut 120 attached to the carriage 110 causes the latter to move upwardly or downwardly relative to the lead screw 115 as the latter is manually rotated by the handle 117. Extending horizontally outwardly from the carriage 110 is an arm 122 having a pair of spaced hooks 123*a* and 123*b* thereon for attachment to the sides of a support seat 30, as shown in FIG. 1.

FIG. 12 shows a modification of the embodiment of FIG. 10 which provides hydraulic power for vertically moving the carriage 110 with the arm 122 along the vertical strut 90 and therefore raising or lowering the support seat 30. Thus, the vertical strut 90 is stably mounted on the automobile car door 12 by a support 92, an upper stop 95, and a lower stop 106, similarly to that as shown in FIG. 10. However, in this case a rod 124 attached to the bottom end of the carriage 110 has a piston 125 on the lower end thereof which extends into a vertically disposed cylinder 127 mounted on a foot 128 provided on the bottom of the vertical strut 90. A hydraulic power supply 138 is provided for pumping fluid into the cylinder 127 to raise the support seat 30 and for returning the fluid to lower the arm 122 and therefore the support seat under load.

The operation of the invalid lift device 10 will next be described in connection with the embodiment shown in FIGS. 1 and 2. Thus, with the door 12 of the automobile 13 opened and the door window 21 rolled down, a wheelchair, (not shown) or other support with an invalid seated therein is disposed adjacent the open doorway. By movement of the front side door 12 on its hinges 33*a* and 33*b* and by movement of the wheelchair, the ends of the lift cables 25*a* and 25*b* may then be brought over the lap of the wheelchair invalid. The attendant then uses the quick connectors 27*a* and 27*b* to connect the support seat 30 being worn by the invalid to the ends of the lift cables 25*a* and 25*b*. The attendant then swings in the knob 49 on handle 31 to release the lock assembly and rotates the handle 31 to thereby elevate the support seat 30 and lift the invalid out of the wheelchair to a desired level. The attendant then releases the knob 49 causing the lock assembly 55 to lock the shaft 38.

The wheelchair is then removed and the invalid lift device 10 with the invalid in its support seat 30 is then horizontally transferred into the automobile interior by swinging the door 12 on its hinges 33*a* and 33*b*. This carries the support seat 30 and the invalid into the interior of the automobile and over the seat 29. The transfer may require some positioning of the invalid's legs by the attendant to dispose the same within the seat compartment.

When the invalid is thus properly disposed, the knob 49 on the handle 31 is again swung inwardly to unlock the shaft. The handle is then rotated to unspool the cables 26*a* and 26*b* to lower the support seat 30 with the invalid into a proper position on the automobile seat 29. Thereupon the support seat 30 worn by the invalid is disengaged from the ends of cables 26*a* and 26*b*. The invalid lift device 10 then is simply dismounted from the door 12 by removing the hook 23 from the bottom edge of the door 12 and lifting the beam 15 from the window ledge 19. When it is desired to move the invalid out of the automobile, the invalid lift 10 can readily be placed again on the automobile door for the purpose of lifting the invalid and transferring him from the automobile seat 29 to a wheel chair or other support positioned in the open doorway.

Reference will next be made to FIGS. 13–16 which show a further embodiment of the invalid lift device for mounting on automobile door 12 which is swingable on its upper and lower hinges 33*a* and 33*b* relative to the body of the automobile. The invalid lift device includes a long, thin beam 150 formed of a tubing having a square cross section. A support or saddle 151 in the form of a channel member is attached to the beam 150 at a point located outwardly of the center of the length thereof. The support 151 has a compressible seat or cushion 152 secured to the bottom thereof which enables it to solidly seat against the window ledge 19 of door 12.

The outer end of the beam 150 is shaped in the form of a clevis 155. The upper end of an outer tube 157*a* having a square cross section is disposed within clevis 155 and is hingeably attached thereto by means of a bolt 153 which passes through openings on the sides of clevis 155 and aligned openings provided in the walls of tubing 157*a* near the inner side thereof. The bolt 153 is held by a nut 154. Positioned for slideably moving telescopically within the outer tube 157*a* is an inner tube 157*b* having a square cross section. A square nut 164 is attached by welding to the upper end of tube 157*b*. Nut 164 rides on a lead screw 165 which passes through a load bearing 160 resting on the upper end of the outer telescoping tube 157*a*. The upper end of lead screw 165 extends into a collar 168 in which it is held by pin 163. A handle 161 is attached to extend outwardly from the side of collar 168. The handle 161 is provided with a knob 162 on the free end thereof.

It should now be clear that the outer and inner tubes 157*a* and 157*b* form an adjustable linkage assembly 156 which can be lengthened or shortened by rotating handle 161 by use of knob 162 in one direction or the other.

At the lower end of the inner tube 157*b*, a chain 158 is attached by means of a bolt 166 and a nut 167. With the lead screw 165 moved up out of the nut 164 such that the adjustable linkage assembly 156 formed by tubes 157*a* and 157*b* is in its lengthened position, as shown in FIG. 13, a hook 159 is adjustably mounted onto one of the links near the bottom of the chain 158 to accommodate for variations in heights of various vehicle doors 12. The hook 159 engages the bottom edge 24 of the door 12. It should be noted that, if necessary, a hole may be drilled into the bottom of door 12 to accommodate hook 159.

The inner portion of the beam 150 is provided with a pair of spaced hooks 149*a* and 149*b* for attachment to the quick connectors 27*a* and 27*b* of the support seat 30, shown in FIG. 1.

It should be noted that with the adjustable linkage assembly 156 formed by the telescoping tubes 157*a* and 157*b* in its lengthened position, as shown in FIG. 13, the beam 150 is tilted about its support 151 such that the inner portion thereof provided with hooks 149*a* and 149*b* is lowered. This facilitates the connecting of the hooks 149*a* and 149*b* to the quick connectors of the support seat (FIG. 1) which is fitted on an invalid seated in a wheel chair (not shown).

Now then, by rotating the handle 161, the lead screw 165 operates to draw the inner tube 157*b* up into the outer tube 157*a* to shorten the adjustable linkage assembly 156. This causes the beam 150 to be tilted on its support 151 about the ledge 19 such that the inner end portion of the beam 150 carrying the support seat 30 is raised, as shown in FIG. 14, to thereby lift the invalid seated in the support seat clear of the wheel chair to such a height that by rotating the door 12 on its hinges 33*a* and 33*b* the invalid can be swung into the interior of the automobile above the seat. The handle 161 is then rotated in the opposite sense to cause the adjustable linkage assembly 156 to be again lengthened, as needed, to lower the invalid onto the vehicle seat.

It should now be clear that the beam 150 is disposed with the cushion 152 of its support 151 resting on the lower ledge 19 of door 12 such that the load of the incapacitated person or invalid on the inner end portion of the beam 150 is counteracted by the tension chain 158 which connects the adjustable linkage assembly 156 on the outer end portion of the beam 150 to the lower edge 24 of the door 12. The rotation of the lead screw 165 by means of handle 161 causes the nut 164 and the inner tube 157*b* to move upwardly or downwardly within outer tube 157*a*, thus lowering or raising the outer end of beam 150 with respect to door 12 and thereby raising or lowering the patient load suspended from the inner portion of beam 150.

It should be particularly noted that by providing a cushion 152 formed of a resilient material, the support 151 is adapted to rest in a stable manner on the window ledges 19 of vehicle doors which have a wide variety of cross sectional shapes and sizes. The resiliency of cushion 152 adapts to the pivotal motion of the beam 150 atop the ledge 19 during the lifting and lowering operations. FIGS. 13 and 14 illustrate the two limiting excursion positions of the beam 150.

While the invention shown and described herein has been adapted to fulfill the objects and advantages previously mentioned as desirable, it is to be understood that the invention is not limited to the specific features shown and described but that the means and configuration herein disclosed are susceptible of modification in form, proportion and arrangement of parts without departing from the principle involved or sacrificing any of its advantages and the invention is therefore claimed in embodiments of various forms all coming within the scope of the claims which follows.

What is claimed is:

1. An invalid lift for vehicles having a door swingable on hinges, comprising:

a hollow beam having a shaft rotatably mounted therein, support means for mounting said beam crosswise and centrally along the lower ledge of the window opening on said door, a seat belt, lift cables spooled on said shaft and extending down from the inner portion of the beam, said lift cables being detachably coupled to support said seat belt, a tension wire anchoring the outer portion of the beam to the lower edge of the door, and means for rotating said shaft to raise or lower said seat belt with an invalid seated therein, whereby the mounting of said beam on said door enables an invalid on the seat belt to be horizontally transferred into and out of the seat of said vehicle by the swinging of said door on its hinges.

2. The invention in accordance with claim 1 wherein said support means includes a resilient cushion which rests on the lower ledge of the window opening of said door.

3. The invention in accordance with claim 2 wherein said resilient cushion is formed of a spongy material.

4. The invention in accordance with claim 1 including a lock mechanism within and near the outer end of said beam for normally engaging and preventing said shaft from rotating.

5. The invention in accordance with claim 4 wherein said lock mechanism includes stops on said shaft, a sleeve slideably held on said shaft and having stopping surfaces therein, a spring on said shaft for urging said sleeve to a position on said shaft where its stopping surfaces engage said stops, and said means for rotating said shaft including a handle pivotally supported off center on the end of said shaft, the inward movement of said handle providing for moving said sleeve on said shaft to disengage said stops from said stopping surfaces whereby said shaft can be rotated by said handle.

6. An invalid lift for vehicles having a door swingable on hinges, comprising:

a beam, support means for mounting said beam crosswise on said door, a seat belt, means for attaching said seat belt to the inner portion of said beam, tension means for anchoring the outer portion of said beam to the lower edge of the door, and means for lengthening or shortening said tension means to cause a pivoting motion of said beam about its support means, thereby lowering or raising said seat belt with an invalid suspended therein, whereby mounting of said beam on said door enables an invalid in the seat belt to be horizontally transferred into and out of the interior of said vehicle by the swinging of said door on its hinges.

7. The invention in accordance with claim 6 wherein said support means includes a resilient cushion having a frictional surface which rests on the lower ledge of the window opening of said door.

8. The invention in accordance with claim 7 wherein said resilient cushion is formed of a spongy material.

9. The invention in accordance with claim 6 wherein said means for lengthening or shortening said tension means includes a lead screw.

10. The invention in accordance with claim 9 including a crank handle for manually rotating said lead screw.

11. An invalid lift adapted to be mounted on a vehicle door swingable on door hinges, said invalid lift comprising:

support means including a beam and having resilient means adapted to be mounted on the window ledge of said door such that said beam extends substantially normal to the inner surface of said door, an invalid support carrier suspended from said beam, counteracting means for transferring the load of said invalid support carrier on said beam to the door, and means on said support means for vertically raising and lowering said support carrier, whereby the support carrier with its invalid load is horizontally transferred into and out of the interior of said vehicle by swinging said door on said door hinges.

12. The invention in accordance with claim 11 wherein said counteracting means includes tension means anchoring an outer end portion of the beam to the bottom of the door.

13. The invention in accordance with claim 11 wherein said counteracting means includes a vertical member connected to said support member and positioned adjacent the inner side of the door, said vertical member having a lower stop thereon bearing against the inner lower end portion of said door, and the portion of said support means adapted to be mounted on the window ledge having a side stop thereon bearing against the upper outer end portion of said door.

* * * * *